(No Model.)

W. H. WRIGHT.
CAN FILLING MACHINE.

No. 376,403. Patented Jan. 10, 1888.

Witnesses,
Geo. H. Strong.
J. H. Towse.

Inventor
W. H. Wright
By Dewey & Co,
attys

UNITED STATES PATENT OFFICE.

WILLIAM H. WRIGHT, OF SAN JOSÉ, CALIFORNIA.

CAN-FILLING MACHINE.

SPECIFICATION forming part of Letters Patent No. 376,403, dated January 10, 1888.

Application filed August 2, 1887. Serial No. 245,987. (No model.)

*To all whom it may concern:*

Be it known that I, WILLIAM H. WRIGHT, of San José, Santa Clara county, State of California, have invented an Improvement in Can-Filling Machines; and I hereby declare the following to be a full, clear, and exact description of the same.

My invention relates to that class of machines for filling cans, bottles, and other receptacles in which the stated quantity of liquid is determined by suitable cups or vessels which are supplied by mechanism operated by the movement of a lever; and my invention consists in a novel valved filling-trough, by which the measuring-cups are supplied, and in the combination of said trough and lever with the cups and their valve mechanism, whereby the entire operation of filling said cups and discharging them is accomplished by a single operation of the lever, all of which I shall hereinafter fully describe, together with details of construction.

The object of my invention is to provide a simple and effective filling-machine for cans, bottles, or other vessels or receptacles.

Figure 1:
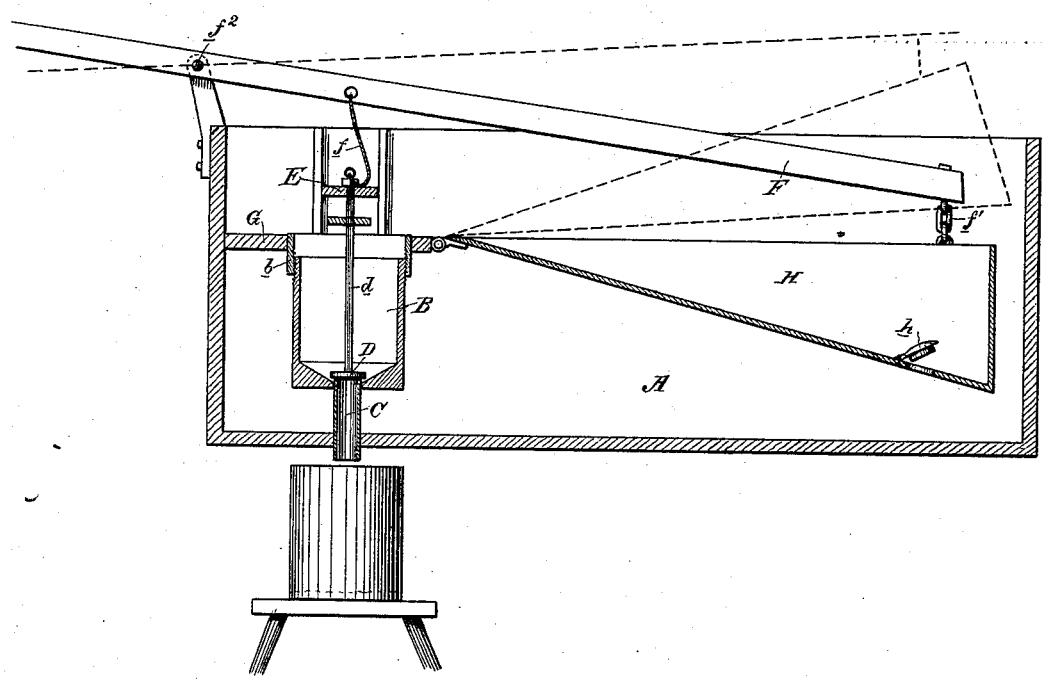
Figure 2:
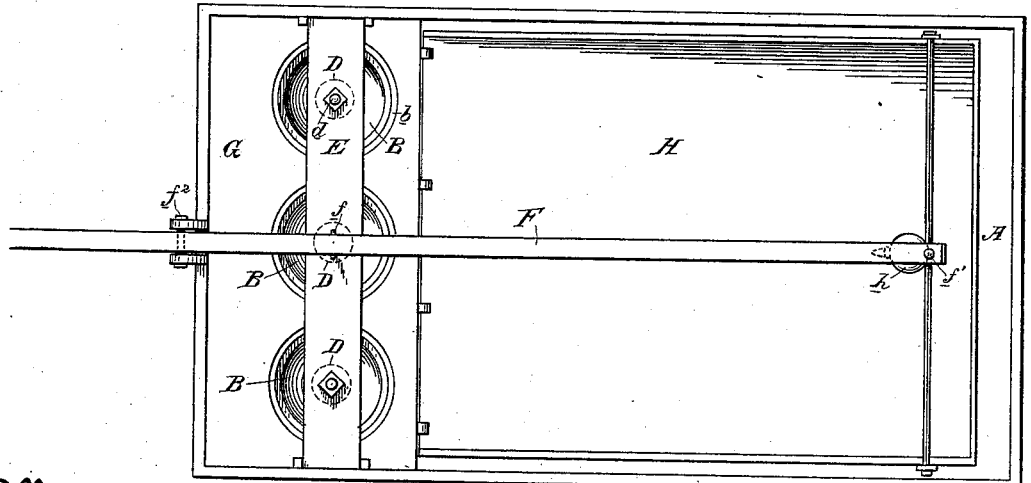

Referring to the accompanying drawings for a more complete explanation of my invention, Figure 1 is a vertical longitudinal section of my can-filling machine. Fig. 2 is a plan of same.

A is a tank or vessel, which may be mounted upon a suitable frame-work or stand, in order to provide for properly placing under it the vessels to be filled.

Within the tank are the measuring-cups B, arranged in a row, and in any number, as may be desirable. These cups have each a capacity equal to the cans or other vessels to be supplied by them, and in order to suit different vessels or cans I may vary the capacity of each measuring-cup by screwing upon each a sleeve, $b$, the vertical adjustment of which determines its capacity. The cups have preferably sloping bottoms, to insure the discharge of their contents, and each cup is fitted by a hole in its bottom to the open top of a discharge-pipe, C, the upper end of which, projecting slightly above the inner surface of the bottom of the cup, is rounded off so as to form a proper seat for the valve. The discharge-pipes C pass down through the bottom of the tank A, and their lower ends are to be in convenient position to enter the open tops of the cans or other vessels to be filled, or to be in proper communication therewith.

D are the valves, which consist of pieces of rubber, adapted to be seated on the open tops of the discharge-pipes, to control the discharge of the liquid from the cups. The valves have stems $d$, which extend upwardly through suitable guides, and have their upper ends connected by a cross-head, E, of sufficient weight to keep the valves down to their seats normally. This cross-head provides for the simultaneous operation of all the valves, and it is connected with the operating-lever F by a cord or link, $f$. Within the tank and fitted over the tops of the cups is a guide-plate, G, to one end of which is hinged the filling-trough H. This trough is preferably made in the shape of a right-angle triangle, its hypotenuse being underneath and its apex being in communication with the tops of the measuring-cups, said apex being the line or axis about which the trough moves. In the bottom of the trough is made an upwardly-swinging valve, $h$, and to its top the end of the lever F is connected by means of a chain or link, $f'$.

The lever F is fulcrumed at $f^2$ on a bearing on one end of the box. I have not deemed it necessary herein to describe or illustrate the main tank or reservoir from which the tank A is supplied, nor the automatic connection—such as a cock controlled by a float—for these are common, and, moreover, an understanding of my invention is not dependent upon their description. It is sufficient to say that the tank A is kept supplied to a level a little below the rims of the measuring-cups.

The operation of the machine is as follows: When the outer end of the lever F is allowed to move upwardly, the filling-trough H descends by its own weight into the tank A, and its valve $h$, opening as the trough descends, permits the liquid in the tank to flow into the trough until the required quantity has found its way into it. The lever F is now pressed downwardly at its outer end, so as to raise the filling-trough H, causing it to turn about its axial line, so that its contents flow out of it and into the measuring-cups, filling them up, the surplus liquid passing back between the cups and over them into the tank again. When all the liquid has passed from the filling-trough, the movement of the lever F is still continued, so that the cord or link $f$, which connects the lever with the cross-head of the valve-stems, and which up to this time remains slack, now becomes taut, and raises the valves, thereby permitting the contents of the cups to flow down through the discharge-pipes C into the vessels placed below. When the lever F is released, the valves close again and the filling-trough descends into the liquid in the tank and receives through its valve a fresh supply, when the operation is continued as before. It will be seen, therefore, that a single operation of the lever effects both the filling of the cups and their discharge.

Having thus described my invention, what I claim as new, and desire to secure by Letters Patent, is—

1. The combination, with the tank, of a plural number of measuring-cups arranged therein and each provided with a valve stem, a triangular trough pivoted in the tank with its apex adjacent to said cups, an operating-lever for said trough, and a connection between said lever and valve-stems, whereby the latter are operated during the movement of the former, substantially as described.

2. In a can-filling machine, a tank for the liquid, measuring-cups within said tank provided with the discharge-pipes through their bottoms, and valves controlling the upper ends of said pipes, said valves having sliding stems, in combination with a swinging filling-trough provided with a valve for admitting the liquid to it, a pivoted lever connected with the trough, whereby it is swung, and a connection between said lever and the valve-stems of the measuring-cups, whereby the valves are raised after the cups are filled in order to discharge their contents, substantially as herein described.

3. In a can-filling machine, the tank for the liquid, measuring-cups therein, provided with valved discharges and with vertically-adjustable sleeves for varying their capacity, in combination with a swinging filling-trough within the tank, having a valve controlling the admission of the liquid to the trough, and a pivoted lever connected with the trough and with the valves of the measuring-cups, whereby the trough is swung upwardly to fill the cups and the valves are raised to permit the discharge of the liquid from said cups, substantially as herein described.

In witness whereof I have hereunto set my hand.

WILLIAM H. WRIGHT.

Witnesses:
J. HINMAN,
WM. MANNING.